United States Patent [19]
Braun et al.

[11] Patent Number: 5,595,270
[45] Date of Patent: Jan. 21, 1997

[54] VIBRATION DAMPER WITH MECHANICAL DECOMPRESSION STOP

[75] Inventors: Günther Braun, Geldersheim; Sabine Rucks, Schweinfurt, both of Germany

[73] Assignee: Fichtel & Sachs AG, Schweinfurt, Germany

[21] Appl. No.: 488,572

[22] Filed: Jun. 8, 1995

[30] Foreign Application Priority Data

Jun. 9, 1994 [DE] Germany .......................... 44 20 134.6

[51] Int. Cl.⁶ ............................................ F16F 9/48
[52] U.S. Cl. ............................ 188/284; 188/322.11
[58] Field of Search .................................. 188/279, 284, 188/285, 311, 314, 317, 322.11

[56] References Cited

U.S. PATENT DOCUMENTS

| | | | |
|---|---|---|---|
| 1,445,615 | 2/1923 | Ferres | 188/284 |
| 2,516,172 | 7/1950 | Baldwin | 188/317 X |
| 3,154,177 | 10/1964 | Szostak | 188/284 |
| 3,831,919 | 8/1974 | Nicholls . | |
| 5,219,414 | 6/1993 | Yamaoka | 188/284 |

FOREIGN PATENT DOCUMENTS

| | | | |
|---|---|---|---|
| 2138711 | 2/1973 | Germany . | |
| 2655705 | 6/1978 | Germany . | |
| 7837029 | 12/1978 | Germany . | |
| 3010690 | 9/1981 | Germany | 188/284 |

*Primary Examiner*—Lee W. Young
*Attorney, Agent, or Firm*—Nils H. Ljungman and Associates

[57] ABSTRACT

Vibration damper, in particular a single-tube vibration damper, comprising a cylinder which is closed on the end by a piston rod guide which centers an axially movable piston rod with a piston, whereby the piston with its damping valves divides the cylinder into an upper and a lower work chamber, and a decompression stop in the form of a compression spring with a round wire cross section which is located in the upper working chamber, characterized by the fact that the compression spring is designed in multiple stages, whereby a first longitudinal segment of the spring interferes with the cylinder and is held in the cylinder by means of this interference fit, and an additional longitudinal segment forms a guide with respect to the piston rod.

17 Claims, 15 Drawing Sheets

FIG. 3a
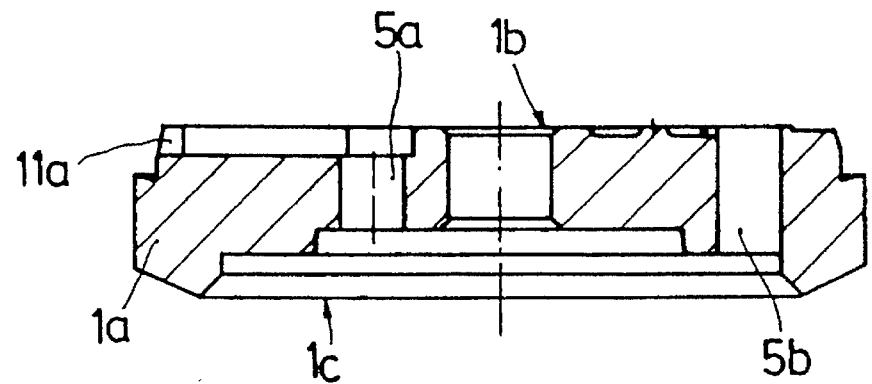
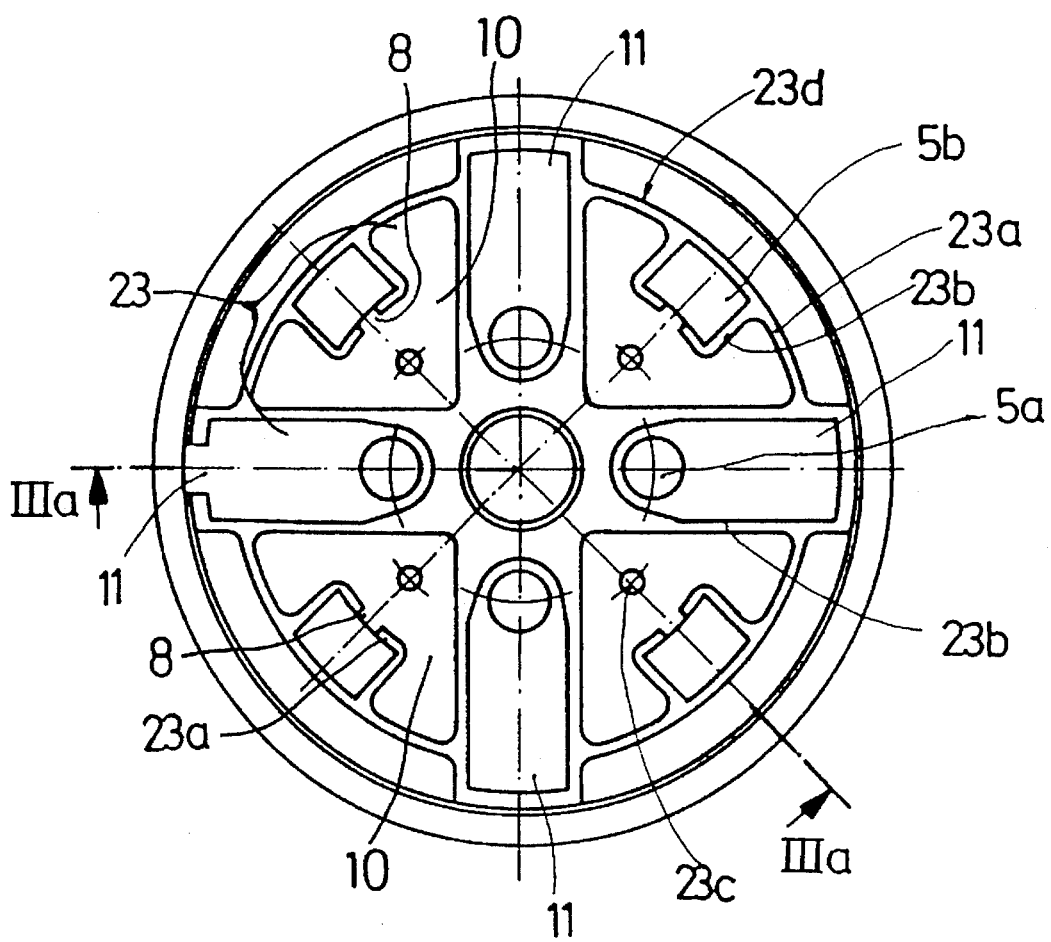
FIG. 3b

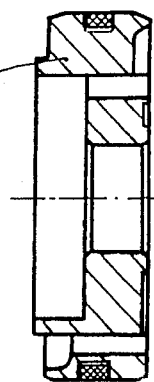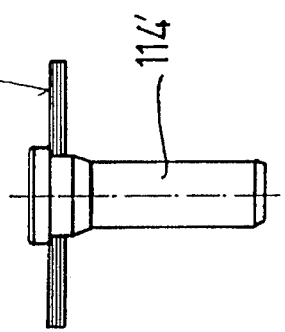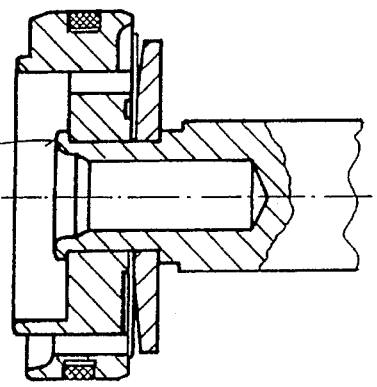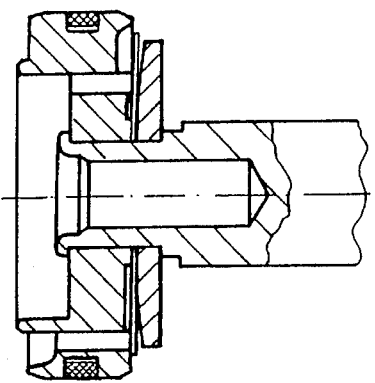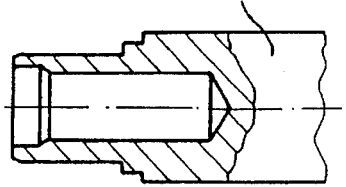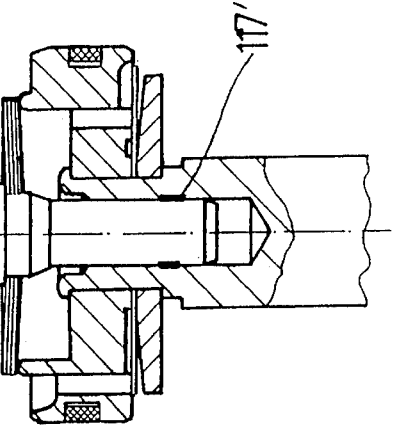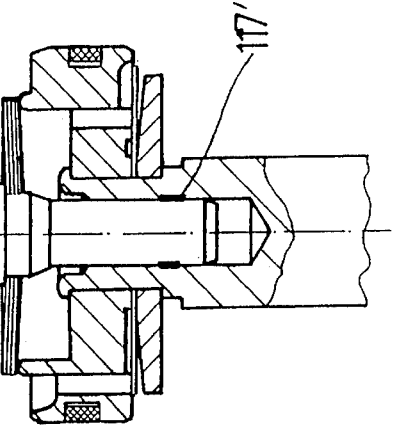
FIG. 11a    FIG. 11b    FIG. 11c    FIG. 11d

VIBRATION DAMPER WITH MECHANICAL DECOMPRESSION STOP

BACKGROUND OF THE INVENTION

1. Field of the Invention

This invention relates to a vibration damper, in particular a single-tube vibration damper, comprising a cylinder which is closed on the end by a piston rod guide which centers an axially movable piston rod with a piston, whereby the piston with its damping valves divides the cylinder into an upper and a lower work chamber, and a decompression stop in the form of a compression spring with a round wire cross section which is located in the top work chamber.

2. Background Information

A similar vibration damper of the prior art is disclosed, for example, in German Patent No. 26 55 705. On this shock absorber of the prior art, a spring is used as a mechanical compression stop, and is located in an upper work chamber which is formed by the cylinder and the piston rod. In the embodiment illustrated in FIGS. 1 and 2 of the prior art, a round wire spring is used which is designed so that it has some play or clearance with respect to the cylinder and the piston rod. The spring is held by means of a damping ring which forms a friction fit with the cylinder. This design can only be used to a limited extent in single-tube dampers, since in single-tube dampers, the cross section of the annulus of the upper work chamber is particularly small. Fastening problems arise in particular if the stop is to be a decompression stop which has no hydraulic components, since it is impossible to use a damping ring to hold the spring. In the variant illustrated in FIGS. 3 and 4 of the prior art, a cornered or polygonal spring is used which interferes with the cylinder and thereby forms an interference fit, the friction force of which holds the spring in the cylinder. A cornered spring is significantly more expensive than a round wire spring, which means that cornered or polygonal springs are used only rarely.

OBJECT OF THE INVENTION

The object of this invention is to realize a vibration damper which has a mechanical decompression stop and uses a round wire spring, whereby the use of a guide body for the spring is unnecessary.

SUMMARY OF THE INVENTION

The invention teaches that this object can be accomplished if the compression spring is designed in multiple stages, whereby a first longitudinal segment of the spring interferes with the cylinder, and is held in the cylinder by means of this interference fit, and an additional longitudinal segment forms a guide with respect to the piston rod. The use of a spring plate or a damping ring for the spring becomes unnecessary. On account of the interference fit, there is a more secure fastening of the spring. No adaptations need to be made either to the piston rod or to the cylinder in mass-produced dampers of the prior art, so that the invention promotes standardization.

To eliminate metal shavings which can be formed by abrasion during the spring process, the invention teaches that the first and the additional longitudinal segment are separated by a spring segment which has conical transitions to each of the other segments, whereby the first and the additional longitudinal segment are realized in the form of non-resilient turns. On account of the conical transitions, the resilient middle longitudinal segment of the spring cannot scrape against either the piston rod or the cylinder.

An additional advantageous characteristic of the invention is that the additional longitudinal segment is supported on a support disc of the damping valve on the piston. The stop rings or similar devices on the piston rod which are required in the prior art can be eliminated altogether, which significantly simplifies the manufacture and assembly of the decompression stop.

BRIEF DESCRIPTION OF THE DRAWINGS

The invention is explained in greater detail below:

FIGS. 3a and 3b respectively show cross sectional and overhead views of a damping valve body as an individual part;

FIGS. 11a–11d illustrate the sequence of assembly of one realization of a piston;

DESCRIPTION OF THE PREFERRED EMBODIMENT

Figure 1:
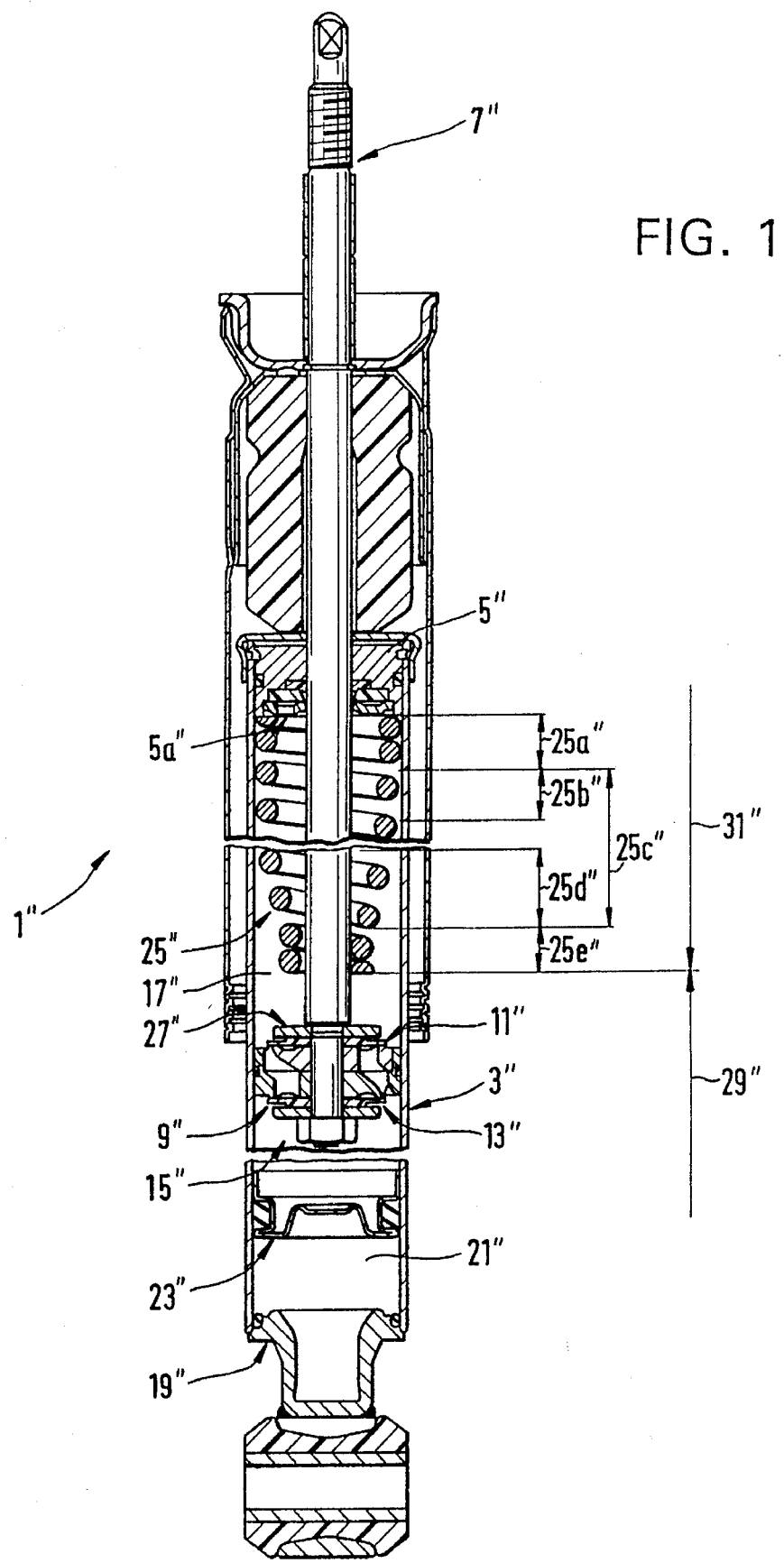
FIG. 1 illustrates a vibration damper which has a single-tube construction, whereby the object of the invention is not restricted to use in a single-tube vibration damper, but can also be used in two-tube vibration dampers or in piston-cylinder units.

The single-tube vibration damper consists of a cylinder 3", the end of which is closed by a piston rod guide 5". The piston rod guide 5" centers an axially movable piston rod 7", fastened to the end of which is a piston 9" with damping valves 11", 13". The piston 9" separates the cylinder 3" into an upper end a lower work cheer 17" and 15" respectively. In the vicinity of a welded-in base 19", there is an equalization or buffer or compensation chamber 21" filled with gas, which chamber is separated from the lower work chamber 15" by means of a float 23".

In the upper, annulus-shaped work chamber 17", there is a coil compression spring 25" with a circular wire cross section, which is supported on the underside 5a" of the piston rod guide 5". In its first longitudinal segment 25a", there are several non-resilient turns which interfere with the cylinder 3". By means of a conical transition 25b", a spring segment 25c" is connected which has sufficient play or clearance with respect to the cylinder 3" and the piston rod 7", so that even in the event of a deflection to the length of the coil, contact with these two components is impossible. An additional longitudinal segment 25e" which represents a guide in relation to the piston rod 7" is connected to the spring segment by means of a conical transition 25d". The guide segment 25e" of the spring also has a number of non-resilient turns, so that guidance is provided over a sufficient length. A support disc 27" of the piston damping valve 11" is used as a stop for the control of the decompression stop i.e. compression spring 25" as a function of the stroke length, so that no additional stops or other stroke-dependent control means are necessary.

During a stroke movement toward the piston rod guide 5", the piston 9" travels a stroke distance 29" which leaves only the damping action of the damping valve 11" effective. After a certain distance has been travelled, the spring 25" is supported with its terminal turn on the support disc 27" of the damping valve 11", so that the spring opposes any further excursion movement with its spring force. In the reverse direction of movement, the spring 25" is supported over a stroke length 31", until the distance between the piston rod guide 5" and the support disc 27" is greater than the relaxed spring length of the spring 25".

During assembly, the piston rod 7" equipped with the piston 9" is inserted into the cylinder 3". Then the spring 25" with its guide segment 25e" is threaded onto the piston rod 7", and the first longitudinal segment 25a" of the spring is engaged on the inside diameter of the cylinder 3". To assemble the piston rod guide 5", the spring is placed in the correct position by the installation movement of the piston rod guide 5". The interference which exists between the spring 25" and the inside diameter of the cylinder 3" prevents a relative movement of the first longitudinal segment 25a" of the spring with respect to the cylinder 3", and holds the spring in the position set during the assembly.

Figure 2:
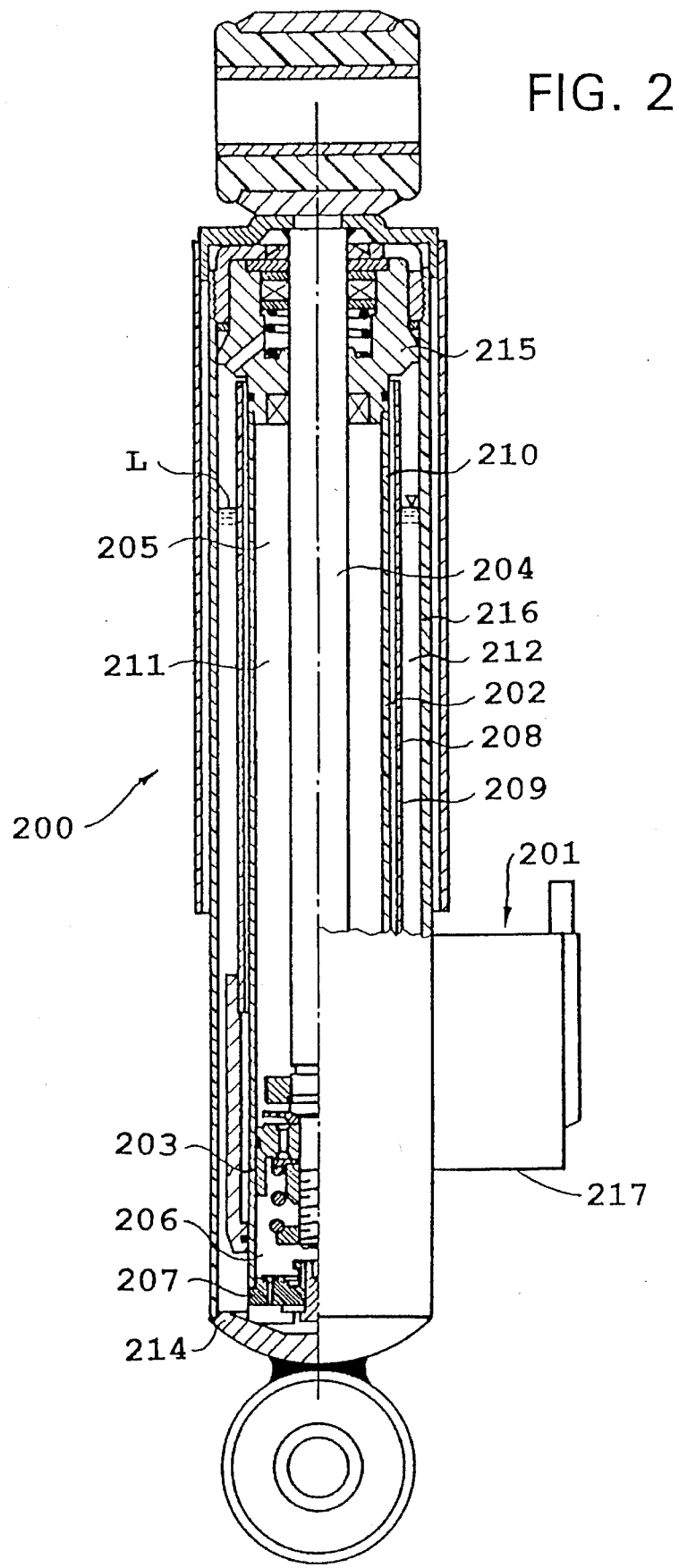
FIGS. 2 and 3 show a typical shock absorber in which the embodiments of the present invention could be incorporated.
Figure 3:
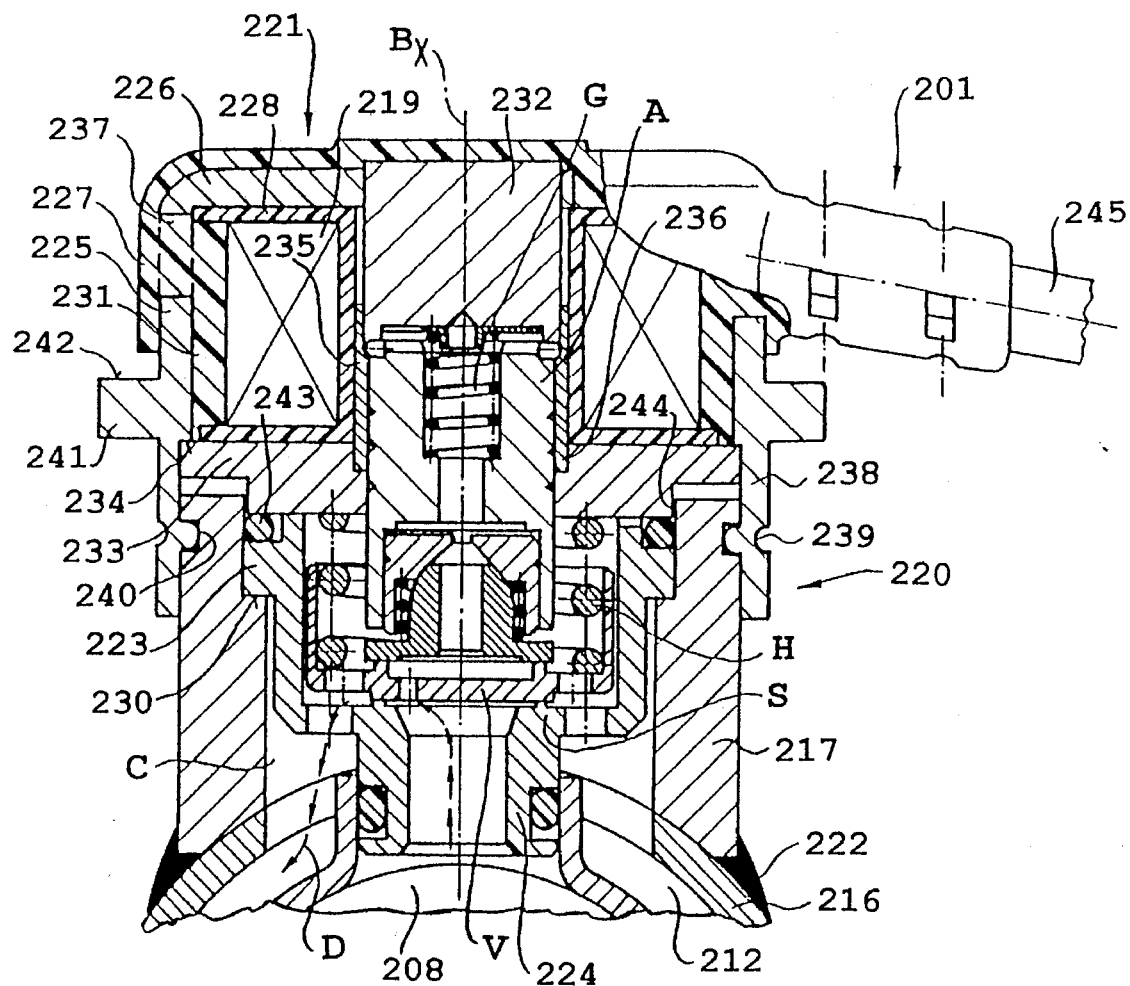

FIGS. 2 and 3 show a typical shock absorber or vibration damper in which the embodiments of the present invention may conceivably be incorporated. It should be understood that the components found hereinbelow are interchangable with the components discussed hereinabove with reference to FIG. 1.

FIG. 2 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows. When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 3, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 3 one can again see the fluid path 208 and the compensating chamber 212, which are interconnectable through the valve unit 201. The fluid path 208 is connected to the upper working chamber 211 as shown in FIG. 2. The flow direction from the fluid path 208 to the compensating chamber 212 across the valve unit 201 is indicated in FIG. 3 by the dotted line D provided with arrows indicating the flow direction both for inward movement and outward movement of the piston rod 204 with respect to the pressure pipe 202. One can see in FIG. 3, a valve member V which can be lifted with respect to a valve seat S, such as to open the flow path D from the fluid path 208 to the compensating chamber 212.

For explaining the principles of the embodiment of the present invention shown in FIGS. 2 and 3, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 3 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

Figure 1A:
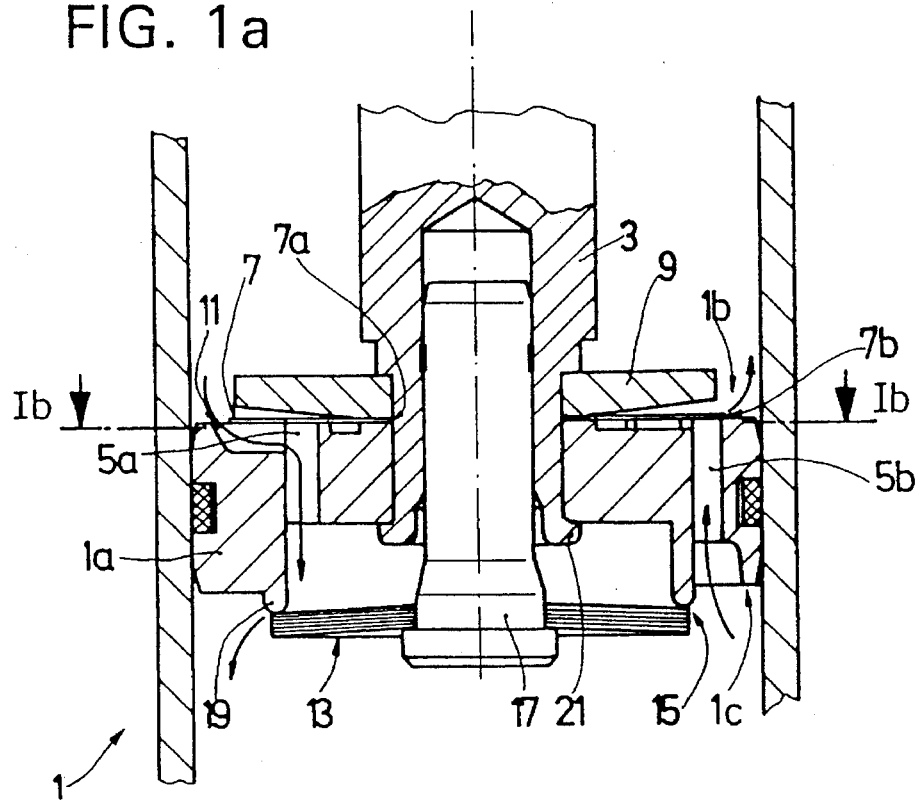
FIGS. 1a and 1b respectively show cross sectional and overhead views of a damping valve on a piston rod.
Figure 1B:
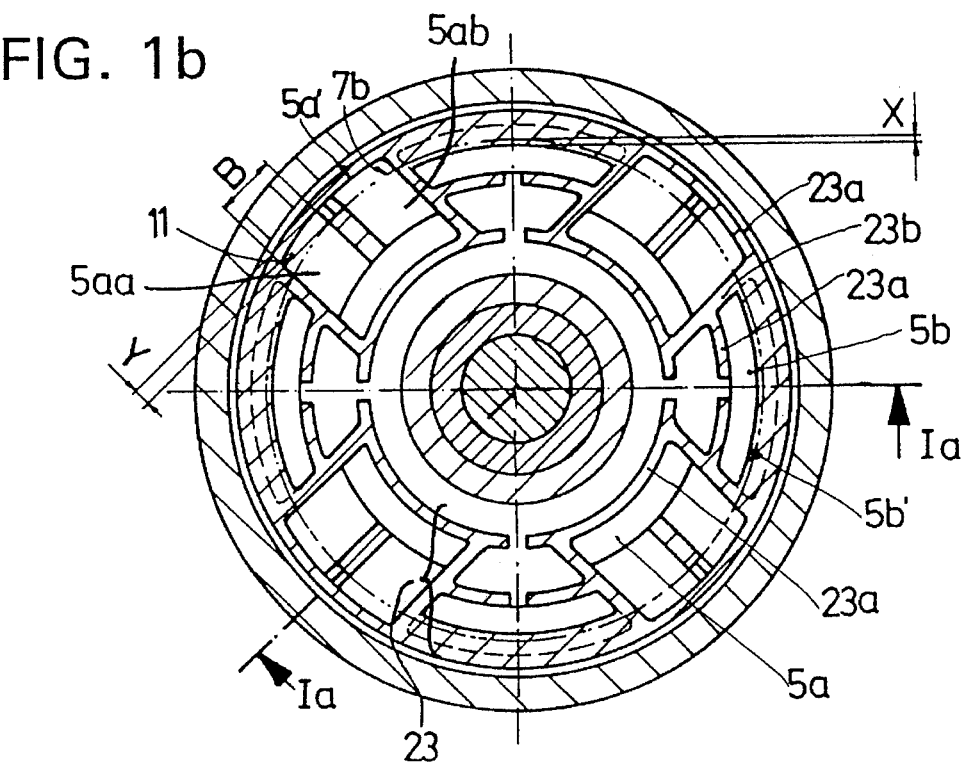
Figure 4:
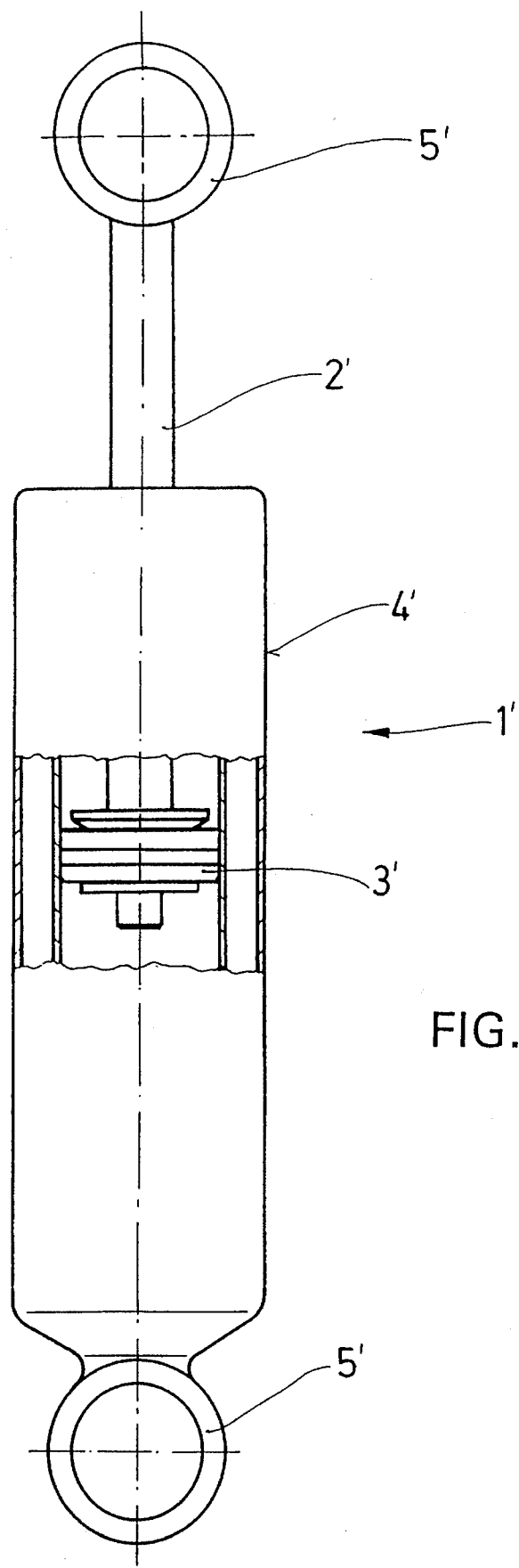
FIG. 4 shows a shock absorber, partly in cross section and partly in a plan view.

FIGS. 1a and 1b show a damping valve 1 of a piston rod 3, as could conventionally be used in a vibration damper as depicted in FIGS. 4 and 2. As shown, the damping valve 1 can generally have a damping valve body 1a. The damping valve body 1a can preferably have at least one fluid flow passage, or admission channel 5a, 5b for each direction of flow of fluid through the valve body 1. Each of these admission channels 5a, 5b preferably connects one side 1b of the damping valve body 1a to another side 1c. In a vertically arranged vibration damper, i.e., as shown in FIGS. 4 and 2, the side 1b can generally be the top side, while the side 1c can be the underside. Alternatively, if the vibration damper orientation as shown in FIGS. 4 and 2 were to be reversed, the designations given above would also be reversed.

On at least one side of the body 1a, in this embodiment the top side 1b, there can preferably be a valve plate 7 which can be firmly fixed by means of its inside diameter 7a. In other words, the valve plate 7 can essentially be held in place by means of its inner area, or area disposed about the inside diameter 7a. This valve plate 7 essentially covers the admission channel 5b (or admission channels 5b, when more than one are provided as shown in FIG. 1b). The channels 5b are the channels which have their discharge cross section on the top side 1b of the valve body 1a. Thus, the valve plate 7 can essentially provide the function of a non-return, or check valve.

With such a valve plate 7, the valve plate 7 can thereby preferably be designed as a solid, circular, ring-shaped disc mounted immediately adjacent the valve body 1a. When there is a fluid pressure from the underside 1c, the valve plate 7 can preferably be deflected upwardly to open the passage 5b. The opening movement of the valve plate 7 upwardly is preferably limited by a support plate 9. As such, when a maximum opening position has been reached by the valve plate 7, the valve plate 7 can preferably be supported on the support plate 9. To adapt the damping valve to have different damping valve characteristics, the standard damping valve body 1a can be very easily equipped with valve plates 7 of different thicknesses and rigidities, to thereby make the opening characteristics harder with stiffer plates, or softer with more flexible plates.

For the reverse direction of flow, i.e. from the top side 1b of the damping valve 1 to the underside 1c of the damping valve 1, there is preferably the admission channel 5a and a valve 15, which valve 15 preferably is formed by at least one valve disc 13 fixed to the underside 1c of the damping valve 1. The valve plate 7 can essentially cover at least a portion of the corresponding admission channel 5a, because of the circular dimensions of the valve plate 7. As such, the valve plate 7 can cover the admission channel 5a to the extent that, between the valve plate 7 and the damping valve body 1a, a passage restriction, or choke 11 can be formed in the vicinity of the admission channel 5a.

This restriction, or choke 11 can essentially have an influence on the operation of the valve 15, by controlling the amount of fluid which passes through the passage 5a, and thus, the pressure acting on the valve discs 13. By selecting the outside diameter 7b of the valve plate 7, the cross section of the choke 11 can very easily be determined for a specified standard damping valve body 1a. As such, for providing valves 1 having various damping characteristics, valve plates 7 of different diameters can be used on essentially the same standard valve body 1a. Alternatively, or in addition to the various diameters of the valve plates 7, the rigidity of the valve discs 13 could also be varied on the standard valve bodies 1a, as discussed above.

The damping valve 15, on the underside 1c, preferably be fixed in place against an encircling edge 19 of the damping valve body 1a by means of a fastening rivet 17, which fastening rivet 17 can be driven into the piston rod 3. This method of assembly, and other alternative methods are discussed further herebelow. The damping valve body 1a can preferably be separately connected to the piston rod 3 by means of a crimp 21. As such, the bias, or prestress of the valve discs 13 can be accomplished independently of the tolerances of the series arrangement of the support plate 9, valve plate 7 and the valve body 1a.

FIG. 1b shows a plan view of the damping valve 1 taken along the line Ib—Ib of FIG. 1a. FIG. 1b also depicts, by lines Ia—Ia, the view of reference for FIG. 1a. As shown in FIG. 1b, the valve plate 7 can preferably be supported on a web labyrinth system 23. This web labyrinth system 23 essentially determines the surface area of the valve plate 7 which is pressurized when the inflow of fluid is from the underside 1a of the damping valve 1. In other words, because of the essentially minimal surface area provided by the web labyrinth system 23 for contact with valve plate 7, there can be a substantial amount of surface area of the valve plate 7 which can be pressurized by fluid flowing into passage 5b.

The web labyrinth system 23 is preferably made up of web segments 23a and 23b. The web segments 23a are essentially arranged substantially concentrically inside one another. The web segments 23a can preferably be connected to one another by means of the webs 23b, which webs 23b essentially run substantially radially with respect to the webs 23a. Thus, by means of the orientation of the segments 23a, 23b, the two directional admission channels 5a, 5b can be fluidly separated from one another. The size and location of the web segments 23b are preferably optimized to provide the best possible contact surface for the valve plate 7, so that the valve plate 7, under essentially any circumstances, will not be deflected when fluid flow is admitted on the top side 1b of the damping valve 1.

The web labyrinth system 23 can also essentially guarantee that there will be no sticking effects between the valve plate 7 and the damping valve body 1a, as the contact surfaces are essentially minimized. As mentioned above, there are also very large surfaces on the valve plate 7 which are pressurized. Thus, because of the large surface area which is pressurized and the minimized sticking between the valve plate 7 and the valve body 1a, an easy, and preferably smooth, opening of the valve plate 7 can be made possible. To essentially guarantee that the two admission channel systems 5a, 5b are reliably separated from one another so that no fluid short circuits occur, the valve plate 7 can preferably be larger by a specified dimension X than a neighboring outside diameter 5b' of the pressurized surface on the valve plate 7.

As shown in FIG. 1b, a width B of the admission channel portions 5aa and 5ab, and the average distance Y between the outside diameter 7b of the valve plate 7 and the outside diameter 5a' of the admission channel 5a essentially determines the section of the choke 11. As a result of this location of the choke 11 on essentially the largest possible arc of the valve body 1a, the negative effects of manufacturing tolerances can be reduced to a minimum. In other words, slight variations in the size of the passage 5a and the diameter of the valve plate 7 will essentially only minimally affect the overall cross sectional area of the passage choke 11, as compared to possible valves wherein the passage 5a, and choke 11 are disposed more centrally in the valve body 1a.

Figure 2A:
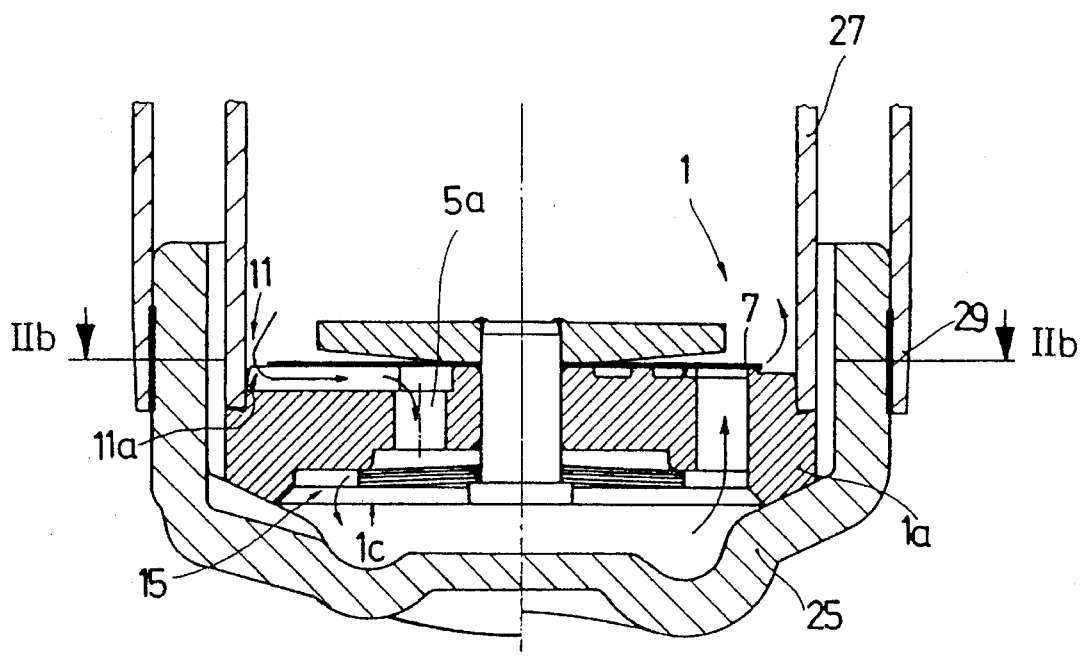
FIGS. 2a and 2b respectively show cross sectional and overhead views of a damping valve in an embodiment as a base valve.
Figure 2B:
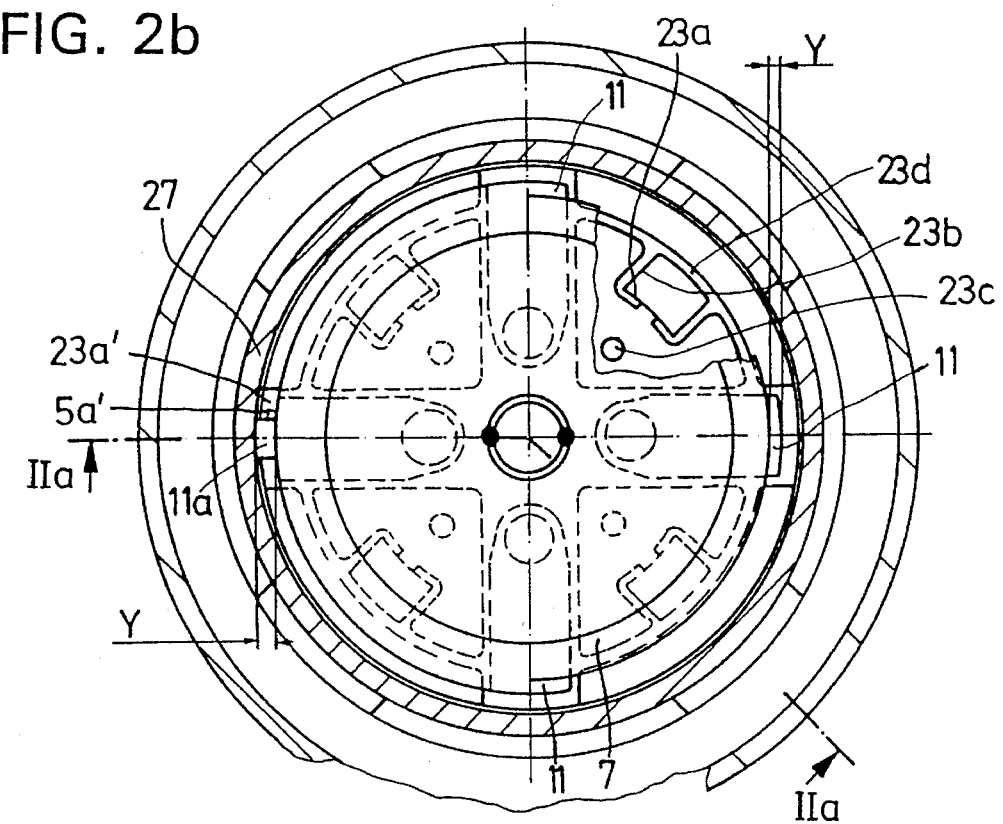

FIGS. 2a and 2b show a damping valve 1 as a base valve of a vibration damper (see full illustration in FIG. 2). Similar to the view shown by FIGS. 1a and 1b, FIG. 2a is a view taken along line IIa—IIa of FIG. 2b, while FIG. 2b is a view taken along line IIb—IIb of FIG. 2a. As shown, the damping valve body 1a can be supported on a base 25 of a vibration damper, which base 25 essentially closes a cylinder tube 27 and a container tube 29, which container tube 29 preferably surrounds the cylinder tube 27.

The basic construction of the valve 1 illustrated in FIGS. 2a and 2b is essentially identical to the valve illustrated in FIGS. 1a and 1b, with a few exceptions. In the valve of FIGS. 2a and 2b, there is a substantially radial passage 11a for the admission channel 5a in the valve body 1a. In a manner as discussed above, this radial passage 11a represents a choke 11 for the damping valve 15 on the underside 1c. This radial passage 11a can preferably be formed in an outermost web 23a' of the web labyrinth system 23, and it can be desirable that only one of the chokes 11 is formed by such a passage 11a.

In the left hand side of the plan view in FIG. 2b, a larger diameter valve plate 7 is shown than the valve plate 7 shown in the right hand side. Thus, it can be seen that the larger the valve plate 7, essentially the smaller the choke 11 to the admission channel 5a, wherein a valve plate could be provided which completely closes off the chokes 11 if so desired. As such, only the radial opening 11a, might be open to the admission channel 5a, while the remaining chokes 11 could be closed off. In the left hand portion of FIG. 2b, since the passage 11a runs essentially radially outwardly to the cylinder 27, the dimension Y would essentially be measured from the edge 7a of the valve plate 7 to the cylinder 27, and not to the inner radial edge 5a' of the outermost web 23a'.

It can generally be understood that, as the outside diameter 7a of the valve plate 7 is reduced in size, the dimension Y increases, so that the cross section of the choke 11 also increases, that is, for chokes 11 having the same dimension B. In essence, since the dimension X (FIG. 1b) must be maintained to prevent short circuits, the valve plate 7 can be reduced in diameter to the point where the choke 11 is maximized, or where the valve plate 7 extends only slightly beyond a next-outermost web 23d.

As shown in FIG. 2b, a multiplicity of chokes 11 can also be used, that is, the chokes 11 can be of various sizes, wherein one of the chokes could have the radial passage 11a. As a result of the different choke cross sections, the damping valve 1 can be tuned very precisely to achieve a specified damping force characteristic. It is particularly advantageous if the smallest choke cross section which achieves the greatest damping action at the maximum speeds, but which is thereby very sensitive to manufacturing tolerances, is formed by a single choke, so that the tolerance defects of the one choke do not accumulate with the tolerance defects of other chokes. The tolerance of the outside diameter 7a can thereby be kept small.

Because of the configuration of the webs 23a, 23b, the admission channels 5a, 5b can be designed so that they are very close to one another without the danger of the occurrence of a hydraulic short circuit in which damping medium bypasses the valve disc 7 and there is communication between the admission channels 5a, 5b. Dimensional limits are set essentially only by the contact surfaces (dimension X) for the valve disc 7 which separate the flow directions from one another.

It should also be noted that in this embodiment, the web system 23 can also preferably provide additional, separate support surfaces 23c, which are designed to prevent a deflection of the valve plate 7.

In FIGS. 3a and 3b, wherein view 3a is a cross section taken along line IIIa—IIIa of FIG. 3b, the damping valve body 1a is shown as an isolated part. Because there are a multiplicity of choke cross sections 11, the pressurized surfaces, in particular of the outer web circumferential area 23d, can be set relatively far out radially, so that there is an optimally large pressurizable surface for the valve plate 7. In this embodiment, too, the web labyrinth system 23 has concentrically-oriented web segments 23a which separate the admission channels 5a, 5b from one another by means of webs 23b which run radially. The admission channels 5a, 5b for both directions of flow can thereby be located on a common arc, or at least on arcs which are very close to one another.

In the depicted embodiments of FIGS. 1b, 2b and 3b, it can essentially be seen that the webs 23a and 23b essentially completely surround the passages 5a, in the immediate vicinity of the passages 5a, that is, essentially immediately adjacent the passages 5a. As such, the radial dimension and circumferential dimension of the passages 5a can preferably be minimized, thereby enabling the fluid flowing through passages 5b to come into preferably maximal contact with the underside of the valve plate 7. With the arrangement as shown, it can be possible to provide at least about twenty-five percent of the cross-sectional area of the piston with passages fluidly open to passages 5b. As such, at least about 30% of the surface area of the underside of the valve plate 7 can be pressurized by fluid from the bottom of the piston. By providing alternative configurations of the webs 23a and 23b, it could essentially be possible to enable up to about 50% pressurization of the underside of the valve plate 7.

As shown in FIG. 3b, there can preferably be radial cuts 8 in some of the webs 23a to thereby allow flow of fluid from passages 5b into the inner areas 10 within the web labyrinth system 23. In essence, while it is desirable to maximize the surface of valve plate 7 which is available to be pressurized by fluid from the underside 1c, a compromise must be made with the amount of support provided for supporting the valve plate 7 against a pressure of fluid from the top side 1b. If insufficient support was provided by webs 23a, 23b, 23d, it might be possible that the valve plate 7 would deform downwardly into spaces between the webs, whereby such downward deformations might give rise to adjoining upward deformations which would cause a fluid short circuit between passages 5a and 5b, thereby rendering the valve inoperative. For this reason, the so-called "labyrinth" arrangement has been found to be appropriate and sufficient for providing maximal surface area for being pressurized, while also providing sufficient support against deformations of the valve plate 7.

In the depicted embodiment of FIGS. 1a and 1b, wherein the vibration damper might have a diameter of about 88.5 mm, the outer radius of the passages 5b is about 33.5 mm, and the outer radius of passages 5b is about 37 mm. As such, allowing about 1 mm for overlap dimension X, this leaves about 2.5 mm available for dimension Y. As such, the radius of valve disc 7 can then preferably be varied between about 34.5 mm to about 37 into provide variable damping characteristics of the valve of FIGS. 1a and 1b. In the same scale, the dimension B is depicted as being about 9 mm. Thus, the cross-sectional area of passage portions 5aa and 5ab can essentially be between about 0 mm to about 22.5 mm. These dimensions are essentially meant as exemplary, and it should be understood, that one of ordinary skill in the art would readily be able to configure the dimensions X, Y and B, accordingly for vibration dampers having other diameters, etc., as such dimensions could be appropriately kept to the same proportions as provided hereabove. In addition, variations on the proportions of the dimensions could also be readily made depending on the desired damping characteristics to be achieved.

In the depicted embodiment of FIGS. 1a and 1b, essentially all of the components of the valve 1 have a rotational symmetry, with the symmetry of the valve body being repeated at about 90° intervals. As such, during assembly, there would essentially not need to be any rotational alignment operations, and the parts would essentially only need to be aligned axially for insertion of one part onto, or into another. Even in the embodiment of FIG. 3b, wherein one of the chokes 11 is provided with the radial passage 5a, there would still essentially not need to be any rotational alignment, as the circular valve plate 7 would essentially cover the same amount of the chokes 7 in every possible orientation of the valve plate 7 on the valve body 1a. Thus, assembly of the valve 1 can essentially be simplified. he damping valve 11" on the piston 9".

One feature of the invention resides broadly in the damping valve, in particular for a vibration damper, comprising a damping valve body which has at least one admission channel for each direction of flow, which admission channel connects a top side and a bottom side of the damping valve body to one another, a valve plate on a valve seat surface, whereby the valve plate can lift up off the valve seat surface, and an choke inside the connection path between the top side and the underside of the damping valve, characterized by the fact that the cross section of the choke 11 is defined by the width of an inflow opening of the admission channel 5" and the average radial distance Y between an edge 7a, 7b which defines the valve plate contour and the inflow opening.

Yet another feature of the invention resides broadly in the damping valve characterized by the fact that the maximum choke cross section is achieved when the outside diameter 7b of the valve plate 7 comes into contact with the outermost circumferential web 23d which defines the discharge region for the reverse direction of flow.

Still another feature of the invention resides broadly in the damping valve characterized by the fact that the web labyrinth system 23 has a radial opening 11a which acts as the choke.

A further feature of the invention resides broadly in the damping valve characterized by the fact that the cross sections of at least two chokes 11 are of sizes which are different from one another.

FIG. 4 illustrates a shock absorber 1' which preferably includes an external tube 4', a piston 3' fastened to a piston rod 2', and the fastening devices 5' which are preferably fastened to the piston rod 2' and to the external tube 4'.

Figure 5:
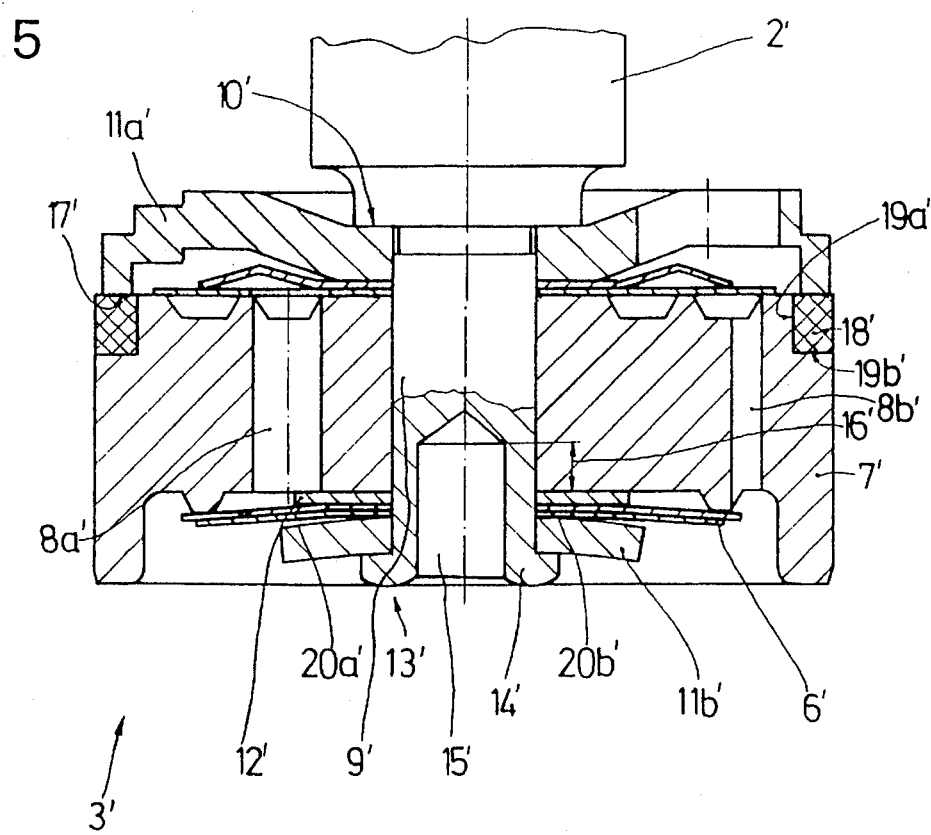
FIGS. 5 and 6 show a piston of a shock absorber in cross section.
Figure 5A:
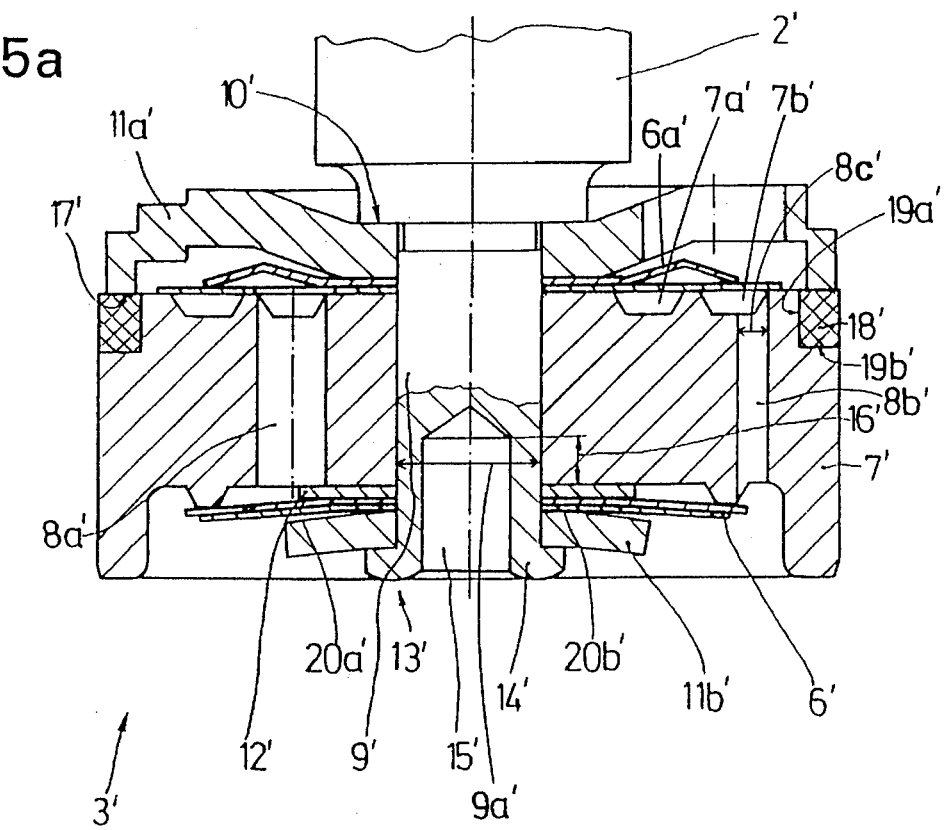
FIGS. 5a and 6a show substantially the same views as FIGS. 5 and 6, respectively, but show additional components.

The piston 3' illustrated in FIGS. 5 and 5a essentially includes a valve body 7', which valve body 7' is preferably provided with passages 8a'/8b', one for each direction of flow. The passages 8a'/8b' are preferably covered at their outlet openings by valve discs 6'. These passages 8a' and 8b' can essentially be similar to the passages 5a and 5b as discussed above with reference to FIGS. 1a, 1b. etc. Depending on the desired damping force setting, valve disc packets or stacks can also be used, whereby valve discs of various thicknesses, graduated diameters or advance opening cross sections can preferably be set inside the packet.

The piston 3' is preferably guided or centered by a journal 9', which journal 9' is a component of the piston rod 2'. A supporting ring 11a' is preferably supported on a shoulder 10' of the piston rod 2', and is preferably adjacent to a series of components consisting essentially of the valve disc packet 6', the valve body 7', a throttle disc 12' and an additional supporting ring 11b'. Preferably, by means of a positive fit 13', the piston 3' is fastened to the piston rod 2'.

The fastening of the piston 3' to the piston rod 2' is preferably achieved by means of a bead 14'. For this bead 14', a blind hole 15' is preferably worked into the journal 9'. This blind hole 15' can advantageously have an overlap 16' with the valve body 7'. During the forming process, which forming process can preferably be forging or possibly cold-forging, an additional axial force component is preferably applied, and a compensation of play between the valve body 7' and the journal 9' is thereby achieved by means of bearing forces in the vicinity of the overlap 16', so that the valve body 7' is preferably fixed on all sides.

In other words, as axial force is applied by a suitable tool during forming, the diameter 9a' (see FIG. 5a) of journal 9' is preferably expanded so that any play between the journal 9' and the valve body 7' is substantially decreased, or possibly eliminated. The forming tool is preferably forced into blind hole 15', thereby expanding the walls of journal 9' and simultaneously forming the beads 14'. Thus, the fit between journal 9' and valve body 7' is preferably much tighter than the fit which is typically achieved by a conventional nut arrangement (i.e. a nut threaded onto journal 9'). Thus, any rattles which can be caused by the contact between journal 9' and valve body 7' can preferably be substantially reduced, or eliminated. Further, the present invention essentially permits the valve body 7' to be centered on the journal 9' more accurately, since essentially all play between valve body 7' and journal 9' can be eliminated.

Generally, during the forming process, the journal 9' will preferably expand substantially equally all around its circumference, thereby grasping the valve body 7' of the piston 3' preferably on all aides. The end result is preferably "mushroomed" shape.

The supporting rings 11a' and 11b', preferably located inside and outside the row of axially braced components, also each preferably perform an additional function. For example, the supporting ring 11a' preferably has a fastening surface 17' as an additional measure to secure a piston ring 18', which piston ring 18' is preferably guided essentially without undercutting, i.e. in this case by means of two contact surfaces 19a' and 19b' on the valve body 7'. With regard to the supporting ring 11b', it should be noted that the ring 11b' preferably has a rolling contour which can be used to influence the damping force characteristic. In this embodiment, the rolling contour is preferably formed by two essentially conical surfaces 20a'/20b'. As a result of this particular shaping process, the damping force characteristic has a progressive curve in the range of higher flow velocities.

Further, in one preferred embodiment as shown in FIG. 5a, the valve body 7' may have two preferably concentric grooves 7a' and 7b'. The grooves 7a' and 7b' may preferably serve to assist in increasing the pressure force generated by passage 8b', since passage 8b' has a relatively small diameter 8c'. The piston 3' may also include a spring body 6a' or possibly a spring valve.

Figure 6:
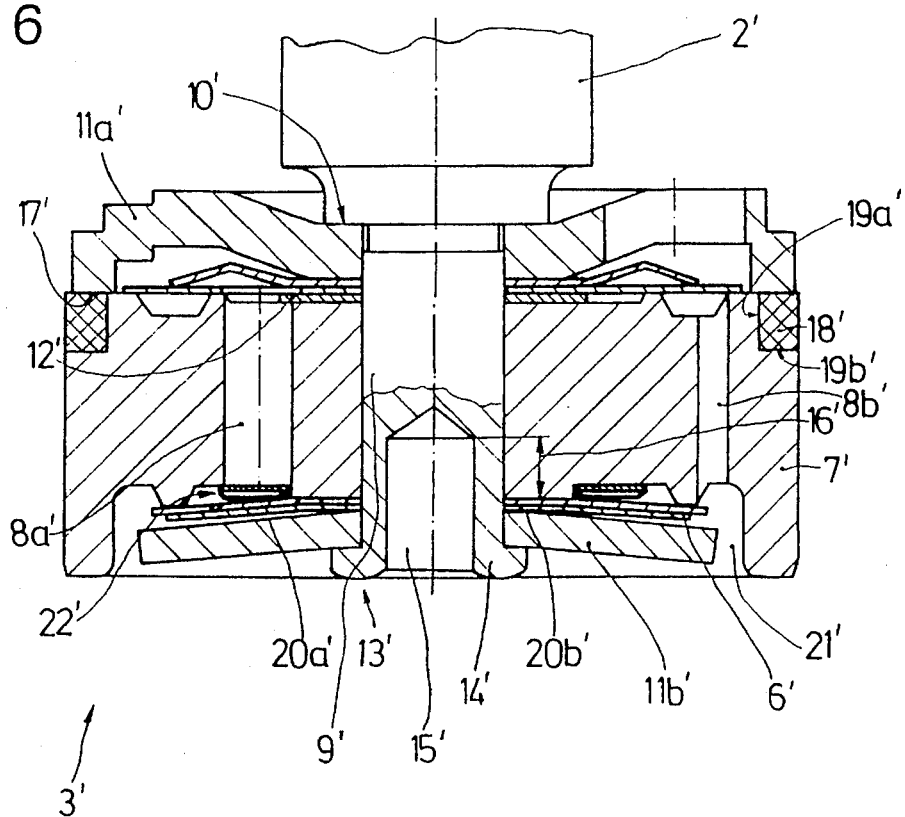
Figure 6A:
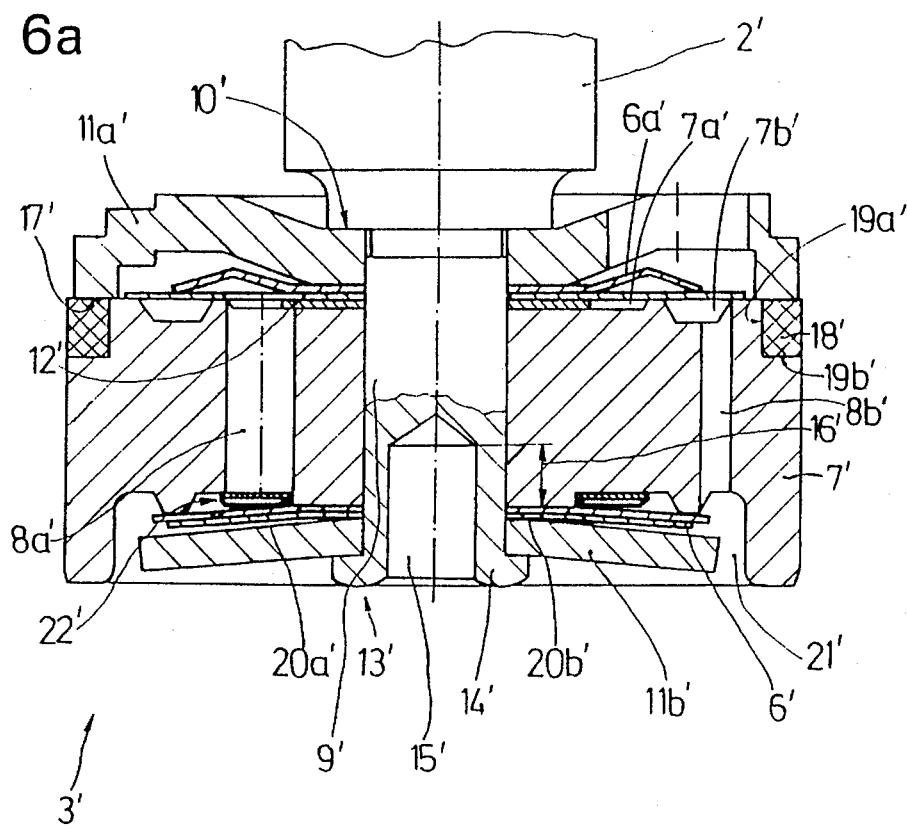

The embodiment illustrated in FIGS. 6 and 6a are essentially distinguished from the embodiment illustrated in FIGS. 5 and 5a in one aspect by the fact that the supporting ring 11a', with its fastening surface 17', is preferably at least partly supported on the end face of the valve body 7'. The fastening surface 17' as well as the contact surfaces 19a' and 19b', preferably form a chamber for the piston ring 18'.

With regard to the piston ring 18', essentially all that needs to be taken into consideration are the contact surface 19a', and the height of the piston ring 18'.

As a variant of the configuration illustrated in FIGS. 5 and 5a, in FIGS. 6 and 6a the throttle disc 12' is preferably shifted toward the supporting ring 11a'.

Thus, the overlap 16' can be preferably significantly increased while retaining the same depth of the blind hole 15', possibly by relocating the throttle disc 12'.

The supporting ring 11b' is also preferably designed so that the decrease in pressure inside the valve occurs over a longer flow distance. The supporting ring 11b', together with the valve body 7', preferably forms an annular gap 21', so that unpleasant flow noises can be suppressed.

To influence the valve characteristic, a return stop 22', preferably in the form of a spring body with a cover disc, can be used, in particular if only small volumes need to be handled in the compression direction.

Of course, it should be understood that the valve design described above can also be employed in a bottom valve. Such a bottom valve may include that shown in FIG. 55 of U.S. Pat. No. 4,650,042, granted to Heinz Knecht et al. on Mar. 17, 1987, or that shown in FIG. 1 of U.S. Pat. No. 4,802,561, granted to Heinz Knecht et al. on Feb. 7, 1989.

Figure 7:
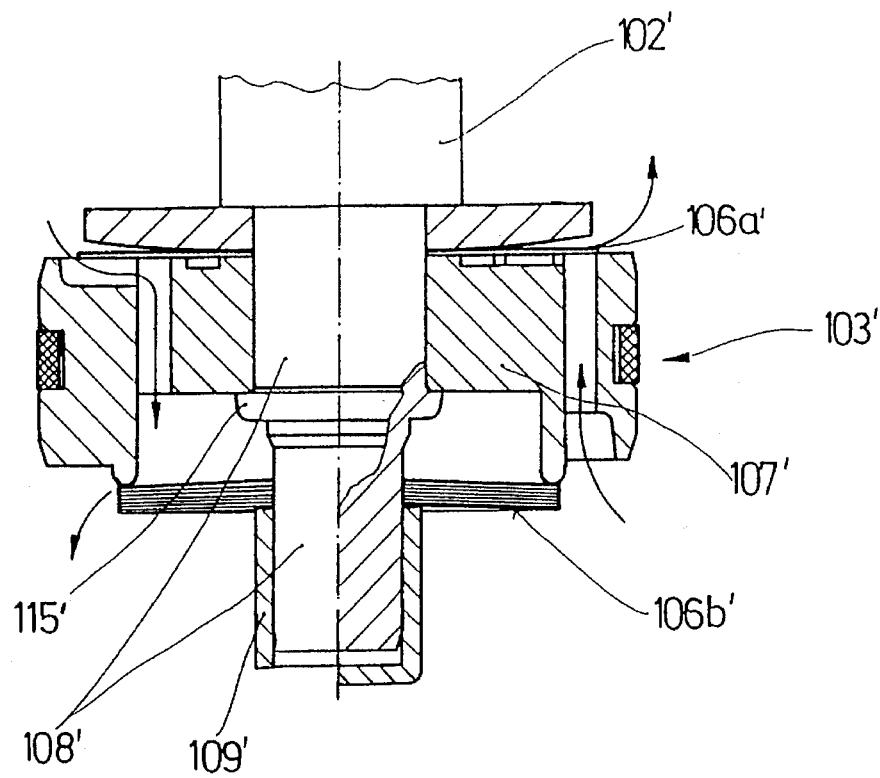
FIGS. 7–10 illustrate various pistons of a shock absorber in cross section.
Figure 7A:
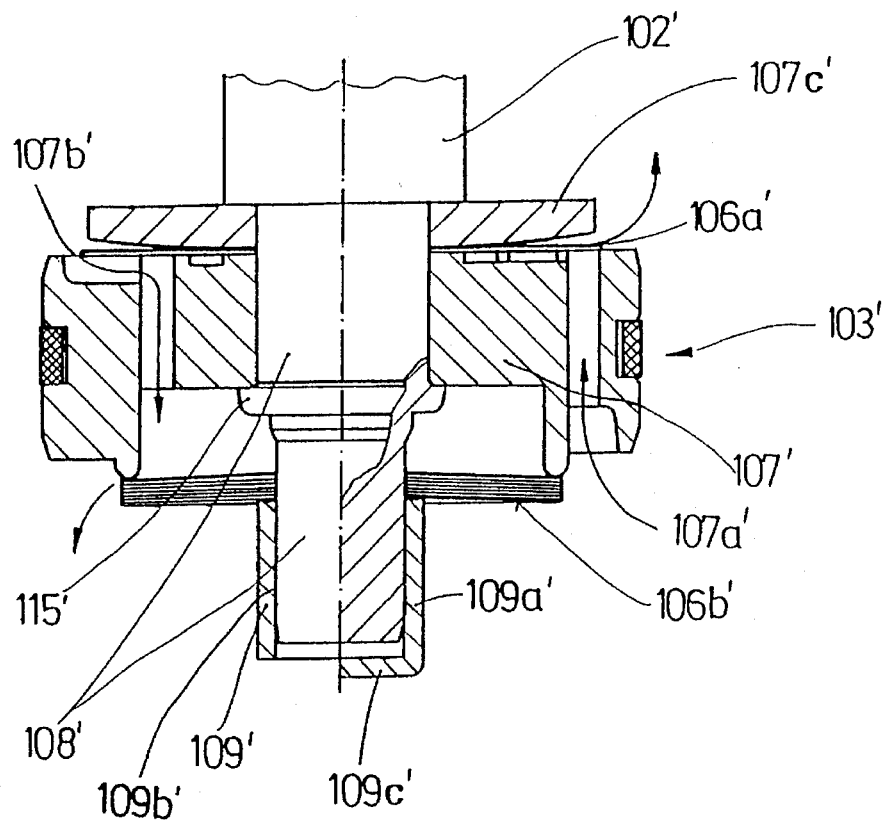
FIGS. 7a, 8a, 9a, and 10a show substantially the same views as FIGS. 7–10, but show additional components.

FIGS. 7 and 7a illustrate one embodiment of a piston 103' in a two-tube shock absorber. In FIGS. 7 and 7a, the piston 103' is illustrated in cross section, whereby on the piston rod 102' there is a preferably cylindrical component 108', which cylindrical component 108' in this embodiment is configured as a journal of the piston rod 102'. The cylindrical component 108' preferably holds, in the axial direction, the valve disc 106a' and the valve body 107'. The fastening element 109' is preferably pushed onto the cylindrical component 108', and an appropriate prestress is applied. After the application of the corresponding prestress, the fastening of the fastening element 109' preferably to the cylindrical component 108' can be accomplished in the form of a weld joint, e.g. by laser welding, in spots or alternatively over the entire circumference. There are two embodiments shown in the lower half of FIGS. 7 and 7a to preferably illustrate an all-around weld seam 109b' and a spot weld 109a'. When an all-around weld seam 109b' is used, the fastening element 109' can preferably be in the form of a sleeve (left half of FIGS. 7 and 7a). If, on the other hand, a spot weld 109a' is used, the fastening element 109' can preferably be in the form of a pot-shaped component (right half of FIGS. 7 and 7a).

Thus, if a spot weld 109a' is employed, the strength of the fastening element may preferably be increased by including a bottom portion 109c'. Thus, the fastening element preferably has the form of a "pot".

The embodiments illustrated in FIGS. 7 and 7a show that the valve body 107' and the valve discs 106a' are already fastened to the cylindrical component by means of a riveted joint 115'. In an additional assembly step, the valve discs 106b' are preferably prestressed and fastened.

Also shown in FIG. 7a are passages 107a' and 107b', one preferably for each direction of flow. The piston 103', in one embodiment thereof, may also include a valve 107c', which valve 107c' may serve to regulate or control the flow through passages 107a' and 107b'. The passages 107a' and 107b', can generally be considered to be similar to the passages 5a and 5b as discussed above with reference to FIGS. 1a and 1b, etc.

Figure 8:
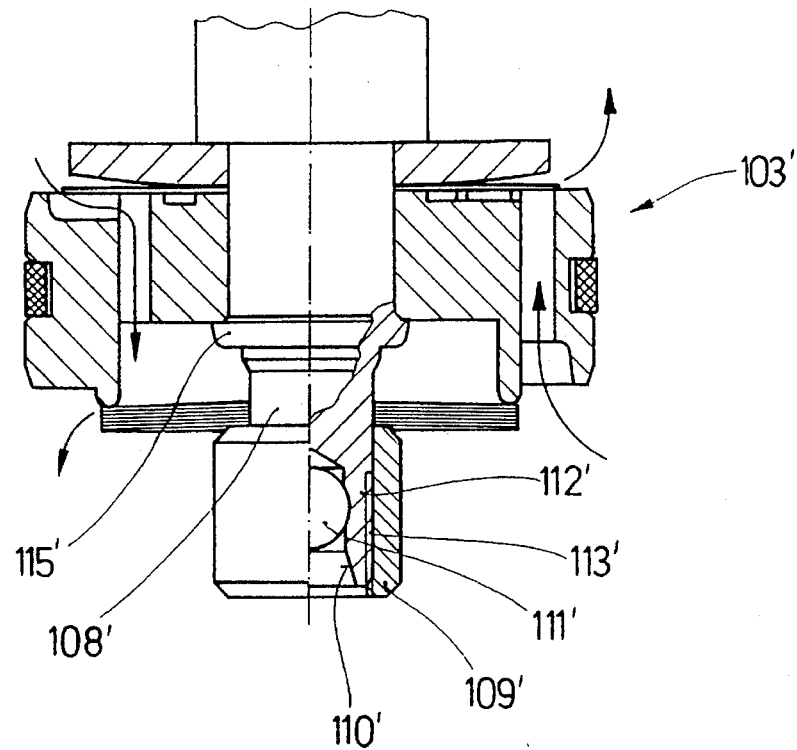
Figure 8A:
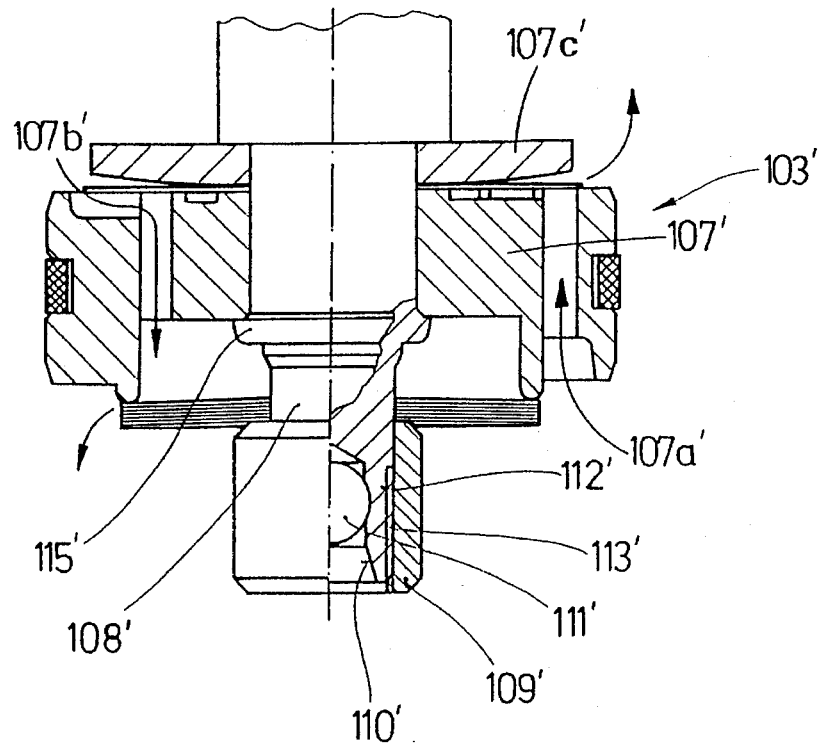

FIGS. 8 and 8a illustrate a piston 103' of a shock absorber, in which the cylindrical component 108' is preferably provided with a hole 110'. A sphere can preferably serve as the expander element 111', and is inserted into this hole 110', so that a positive fit is preferably produced by means of the projections 112' and recesses 113', and by the expansion of the cylindrical component 108' preferably as a result of the pressure exerted by the expander element 111'. This spherical closure illustrated in FIGS. 7 and 7a can also preferably be installed essentially without the generation of any chips which can typically be caused by cutting or machining processes. By means of a corresponding device, or suitable tool, a corresponding pre-stress can be applied to the fastening element 109', whereby the expander element 111', the cylindrical component 108', and the fastening element 109' can then be connected to one another in the respective or desired position. The embodiment illustrated in FIG. 11 also preferably provided with a riveted joint 115'.

Passages 107a' and 107b' are shown in the embodiment illustrated in FIG. 8a, one passage preferably for each direction of flow. The piston 103', in one embodiment may also have a valve 107c' which valve 107c' can serve to regulate the flow through passages 107a' and 107b'. The passages 107a' and 107b' and the valve 107c' are generally well-known to those of ordinary skill in the art and will not be discussed further here.

Figure 9:
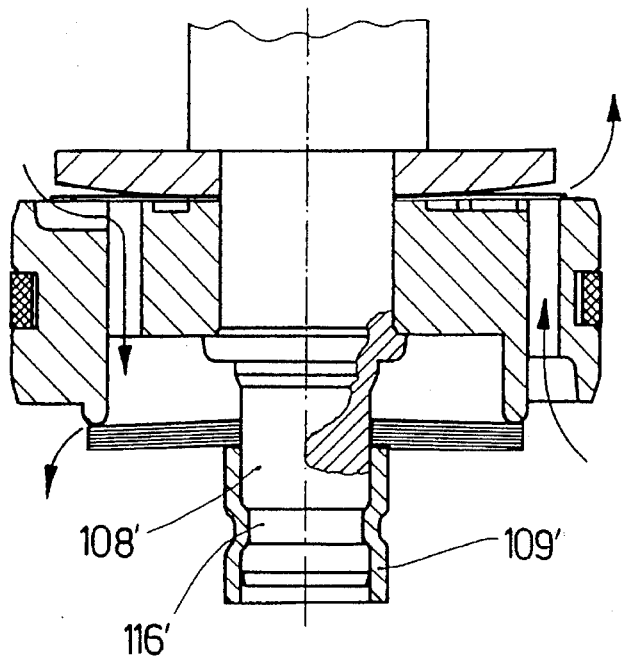
Figure 9A:
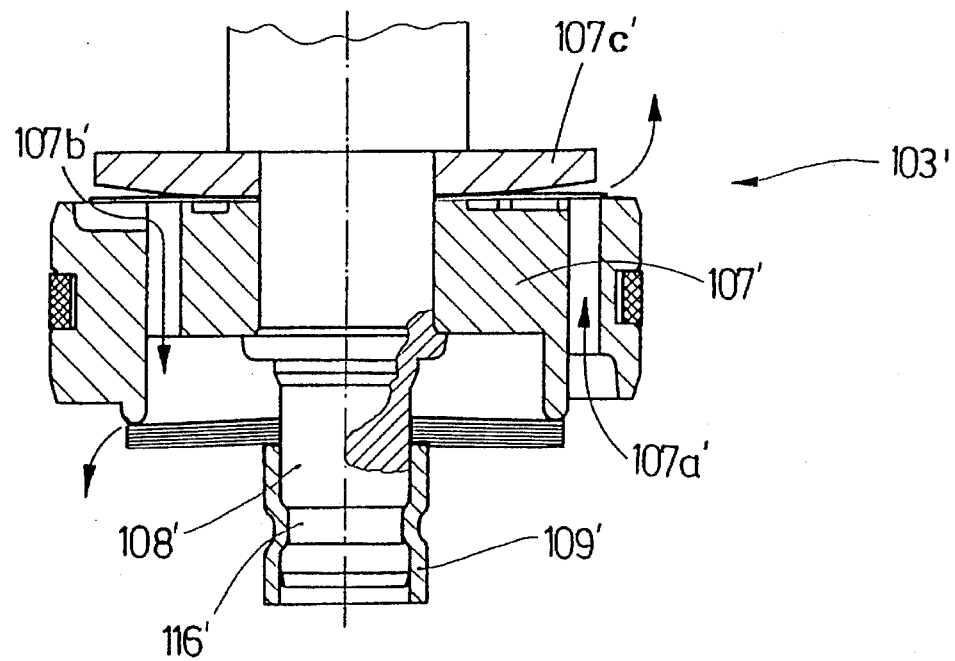

FIGS. 9 and 9a show a fastening element 109' preferably made of light metal or light metal alloy, which fastening element 109' has preferably been shrink-fitted in an essentially contactless manner onto the cylindrical component 108'. The groove 116' of the cylindrical component is thereby preferably used to achieve the positive fit.

The type of fastenings illustrated in FIGS. 9 and 9a may also conceivably be accomplished by a compression fitting of fastening element 109' onto cylindrical component 108'. In this type of fastening, a suitable tool can preferably be used to grasp fastening element 109' and by compression, force fastening element 109' onto cylindrical component 108'.

As shown in FIG. 9a, one embodiment of the present invention may include the valve body 107' having passages 107a' and 107b', one preferably for each direction of flow. The piston 103' may also include a valve 107c', which valve 107c' can preferably serve to regulate or control the flow through passages 107a' and 107b'. The passages 107a' and 107b', and valve 107c' can generally considered to be similar to the passages 5a and 5b and the valve components 7 and 9 as discussed above with reference to FIGS. 1a and 1b, etc.

Figure 10:
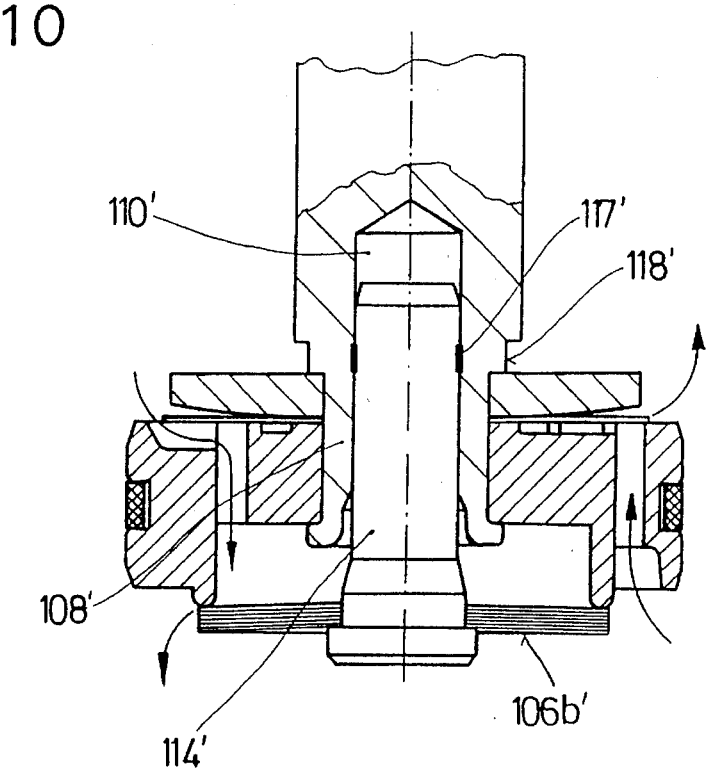
Figure 10A:
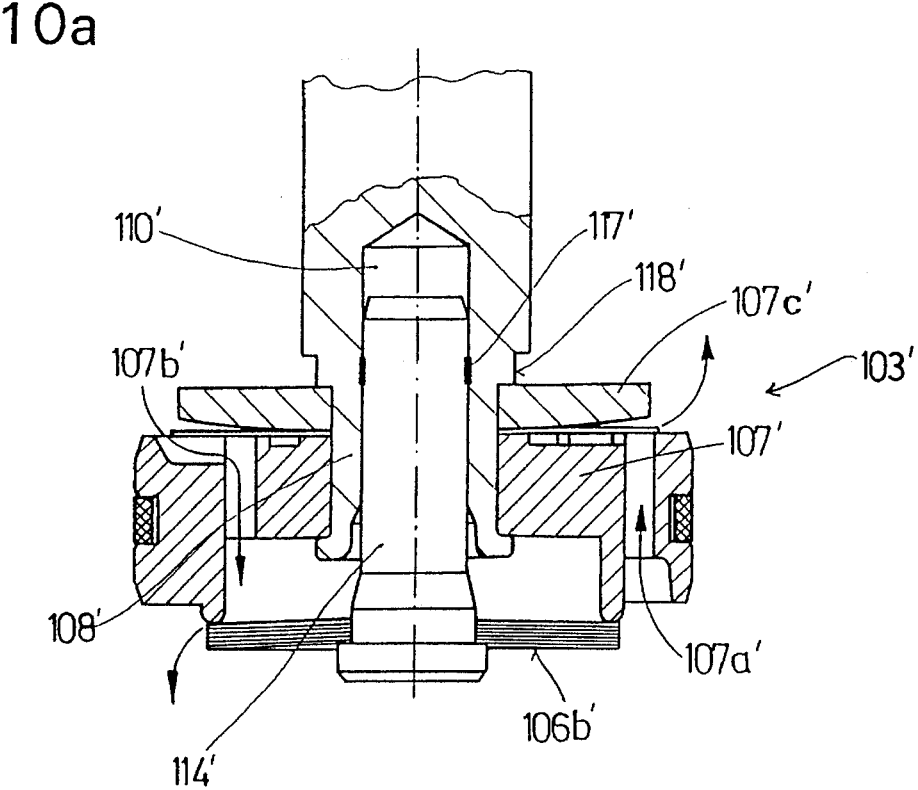

FIGS. 10 and 10a illustrate an additional type of connection, whereby a cylindrical component 114' is preferably housed in the hole 110' of the cylindrical component 108'. After the prestress has preferably been applied by means of the cylindrical component 114' on the valve discs 106b', the fastening can be realized, for example, by means of a laser weld 117'. The shoulder 118' preferably reduces the distance from the outside to the weld point 117', or in different embodiments the shoulder 118' can preferably be used to achieve a distance which is preferably approximately equal along the circumference of the cylindrical component 108'.

As shown in FIG. 10a, one embodiment of the present invention may include the passages 107a' and 107b' of the valve body 107'. The piston 103' may also include a valve 107c'.

FIGS. 11a–11d illustrate one example of the sequence of an automatic assembly process. In FIG. 11a, valve discs 106a' and the valve body 107' are preferably threaded onto the piston rod 102', which are then (FIG. 11b) preferably connected together by means of the riveted joint 115'. The valve discs 106b' are then (FIG. 11c) preferably assembled with the cylindrical element 114'. After the application of a prestress (FIG. 11d), the fastening is preferably performed, e.g. by means of the weld 117'.

Figure 12:
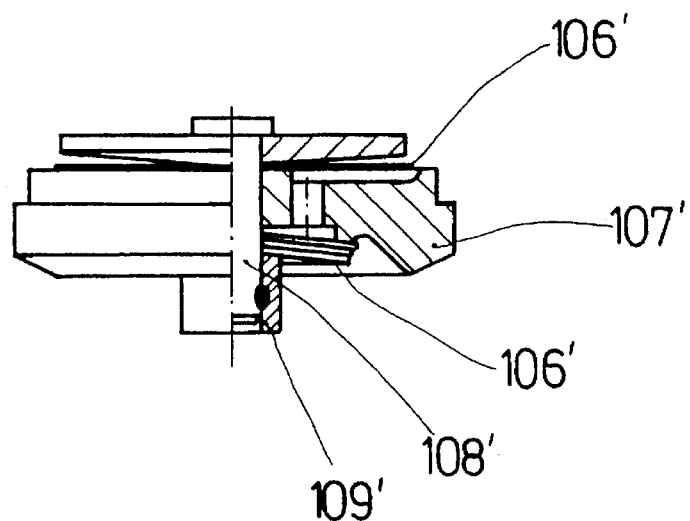
FIG. 12 illustrates a bottom valve of a shock absorber, partly in cross section and partly in a plan view.
Figure 12A:
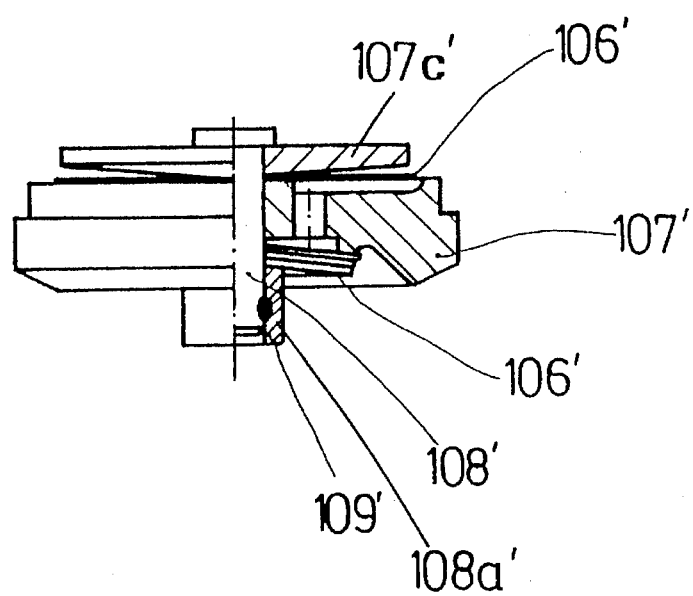
FIG. 12a shows substantially the same view as FIG. 12, but shows additional components.

FIGS. 12 and 12a illustrate a bottom valve, in which bottom valve once again the valve discs 106' and the valve body 107' are preferably inserted onto the cylindrical component 108', and are axially prestressed preferably by means of a fastening element 109' and fastened by means of a weld joint 108a' (see FIG. 12a).

Alternatively, this weld joint 108a' (see FIG. 12a) can preferably be replaced by a positive connection (not shown), in which the fastening element 109' and the cylindrical component 108' are preferably connected by means of an expander element 111', similar to the one illustrated in FIGS. 8 and 8a, which expander element 111' is preferably introduced in a hole (not shown) of the cylindrical component 108'. Here again, it is also possible to shrink fit the fastening element 109' onto cylindrical component 108', similar to the arrangement illustrated in FIGS. 9 and 9a.

One feature of the invention resides broadly in the vibration damper, in particular a single-tube vibration damper, comprising a cylinder which is closed on the end by a piston rod guide which centers an axially movable piston rod with a piston, whereby the piston with its damping valves divides the cylinder into an upper and a lower work chamber, and a decompression stop in the form of a compression spring with a round wire cross section which is located in the top work chamber, characterized by the fact that the compression spring 25" is designed in multiple stages, whereby a first longitudinal segment 25a" of the spring interferes with the cylinder 3" and is held in the cylinder 3" by means of this interference fit, and an additional longitudinal segment 25e" forms a guide with respect to the piston rod 7".

Another feature of the invention resides broadly in the vibration damper characterized by the fact that the first segment 25a" and the additional longitudinal segment 25e" are separated by a spring segment 25c with conical transitions 25b", 25d", whereby the first segment and the additional longitudinal segment are realized by non-resilient or non-elastic or non-springing turns.

Yet another feature of the invention resides broadly in the vibration damper characterized by the fact that the additional longitudinal segment 25e" is supported on a support disc 27" of the damping valve 11" on the piston 9".

Various types of bottom valves in which the present invention may be incorporated in a manner similar to that described with regard to FIGS. 12 and 12a may be disclosed in U.S. Pat. No. 4,802,561 and U.S. Pat. No. 4,650,042, both cited previously herein.

Various types of forming processes which may conceivably be utilized in accordance with the embodiments of the present are disclosed in "Metal Forming Fundamentals and Applications", by Altan et al., published by the American Society for Metals in 1983. Pages 8 through 35 describe various forming techniques and methods which may be used to form various component of the present invention.

Various types of forming machines and forming tools which may conceivably be utilized to form various components of the present invention are also discussed in the aforementioned American Society for Metals publication on pages 103, 119, 120, 126, and 174–177. Some examples of forming machines discussed in the these pages are screw presses, crank presses, rolling mills, and hammers.

Further, the process of plastic deformation, which process in at least some aspects may apply to the forming of the various components of the embodiments of the present invention, is discussed on pages 45–82 of the aforementioned American Society for Metals publication.

The aforementioned American Society for Metals publication, namely "Metal Forming Fundamentals and Applications", the complete text thereof and the specific pages cited hereinabove, are hereby incorporated by reference as is set forth in their entirety herein.

Examples of shock absorber assemblies and components associated therewith, which may be utilized in accordance with the embodiments of the present invention, may be found in the following U.S. Pat. Nos.: 4,986,393, which issued to Preukschat et al. on Jan. 22, 1991; 4,749,070, which issued to Moser et al. on Jun. 7, 1988; and 4,723,640, which issued to Beck on Feb. 9, 1988.

Examples of MacPherson struts which may be utilized with the present invention may be found in the following U.S. Pat. Nos.: U.S. Pat. No. 5,232,209, entitled "MacPherson Strut Assembly or the Like;" U.S. Pat. No. 5,301,932, entitled, "Vehicular Strut Type Suspension;" U.S. Pat. No. 4,963,759, entitled "McPherson-Type Motor-Vehicle Suspension;" U.S. Pat. No. 5,074,579, entitled "McPherson-type Suspension Unit for Motor Vehicles;" U.S. Pat. No. 4,817,984, entitled "Vehicle Suspension System;" and U.S. Pat. No. 4,828,237, entitled "Reduced Length MacPherson Strut."

Examples of conical springs which may be utilized with the present invention may be found in the following U.S. Pat. Nos.: U.S. Pat. No. 4,677,263, entitled "Air Spring Position Switch" and U.S. Pat. No. 4,779,852, entitled "Vibration Isolator and Shock Absorber Device with conical Disc Springs."

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 20 134.6, filed on Jun. 9, 1994, having inventors Günther Braun and Sabine Rucks, and DE-OS P 44 20 134.6 and DE-PS P 44 20 134.6, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber, said shock absorber comprising:

a first end and a second end;

a cylinder defining a chamber therein, said cylinder containing a damping fluid;

a piston rod sealingly projecting into said cylinder and being axially displaceable within said cylinder, said piston rod having a longitudinal axis, a first end portion and a second end portion;

a piston being attached to said first end portion of said piston rod, said piston being slidably disposed within said cylinder to sealingly divide said chamber into a first working chamber and a second working chamber; and means for permitting fluid communication between said first working chamber and said second working chamber;

said cylinder being disposed between said first end and said second end;

said first end comprising first means for connecting said shock absorber to a first body; and said second end comprising second means for connecting said shock absorber to a second body;

said cylinder comprising:
   a first end and a second end, said piston rod sealingly projecting into said first end of said cylinder; and
   a spring within said cylinder;
   said spring being disposed within said first chamber;
   said first chamber being disposed at said first end of said cylinder;
   said spring comprising a first portion and a second portion;
   said first portion of said spring being disposed adjacent to said first end of said cylinder;
   said second portion of said spring being disposed away from said first end of said cylinder towards said piston;
   said cylinder having an inner wall;
   said first portion of said spring being disposed tightly against said inner wall of said cylinder; and
   said second portion of said spring being disposed about and substantially adjacent said first end portion of said piston rod;
wherein said spring comprises a coil spring;
wherein said second portion of said spring is disposed immediately adjacent to said piston rod to form a guide portion and thereby prevent said second portion of said spring from moving excessively transversely within said chamber;
wherein said guide portion of said spring is disposed to prevent said second portion of said spring from moving substantially transversely within said chamber; and
wherein said second portion of said spring comprises a substantially non-compressible tightly wound portion comprising a plurality of coil turns, and wherein said plurality of coil turns of said second portion of said spring are in contact with one another upon said spring being in a relaxed, noncompressed state.

2. A shock absorber according to claim 1, wherein said first portion of said spring comprises another substantially non-compressible tightly wound portion comprising another plurality of coil turns, and wherein another plurality of coil turns of said first portion of said spring are in contact with one another upon said spring being in a relaxed, noncompressed state.

3. A shock absorber according to claim 2:
wherein said piston has a range of travel longitudinally within said cylinder between a first extreme position and a second extreme position; and
wherein said piston is substantially spaced from and in a noncontacting relationship with said spring when said piston is in said first extreme position.

4. A shock absorber according to claim 3, wherein said first portion of said spring has a first diameter and said second portion of said spring has a second diameter, and wherein said spring comprises an intermediate section disposed between said first portion and said second portion, said intermediate section comprising at least one conical transition portion disposed between said first portion of said spring and said second portion of said spring, said at least one conical transition portion having a diameter varying along said longitudinal axis of said piston rod from said first diameter of said spring to said second diameter of said spring.

5. A shock absorber according to claim 4, wherein said shock absorber additionally comprises a support disk disposed about said piston rod and on said piston, said second portion of said spring being disposed to contact said support disk disposed on said piston over at least a portion of said range of travel of said piston longitudinally within said cylinder between said first and second extreme positions.

6. A shock absorber according to claim 5, wherein said first portion of said spring is of substantially cylindrical cross section.

7. A shock absorber according to claim 6, wherein said second portion of said spring is of substantially cylindrical cross section.

8. A shock absorber according to claim 7, wherein said at least one conical transition portion of said spring disposed between said first and second portions of said spring comprises a first conical transition portion and a second conical transition portion separate and distinct from said first conical transition portion.

9. A shock absorber according to claim 8, wherein said first conical transition portion and said second conical transition portion have substantially different conicities.

10. A shock absorber according to claim 9, wherein said first portion of said spring comprises at least two coil turns.

11. A shock absorber according to claim 10, wherein said second portion of said spring comprises at least two coil turns.

12. A shock absorber according to claim 11, wherein said at least one conical transition portion of said spring comprises at least four coil turns.

13. A shock absorber according to claim 12, wherein said shock absorber additionally comprises an equalization chamber disposed within said cylinder on a side of said piston opposite said spring.

14. A shock absorber according to claim 13, wherein said shock absorber further comprises a float, said float being disposed between said equalization chamber and one of said first and second working chambers.

15. A shock absorber according to claim 14, said shock absorber additionally comprising piston rod guide means for centering said piston rod in said cylinder, said piston rod guide means comprising a piston rod guide member for closing at least one of said first and second ends of said chamber, and wherein said means for permitting fluid communication between said first and second working chambers comprises damping valves provided on said piston.

16. A shock absorber according to claim 15, wherein said spring comprises a wire member having a substantially round cross section.

17. A shock absorber, said shock absorber comprising:
a first end and a second end;
a cylinder defining a chamber therein, said cylinder containing a damping fluid;
a piston rod sealingly projecting into said cylinder and being axially displaceable within said cylinder, said piston rod having a longitudinal axis, a first end portion and a second end portion;
a piston being attached to said first end portion of said piston rod, said piston being slidably disposed within said cylinder to sealingly divide said chamber into a first working chamber and a second working chamber; and
means for permitting fluid communication between said first working chamber and said second working chamber;
said cylinder being disposed between said first end and said second end;
said first end comprising first means for connecting said shock absorber to a first body; and
said second end comprising second means for connecting said shock absorber to a second body;

said cylinder comprising:
  a first end and a second end, said piston rod sealingly projecting into said first end of said cylinder; and
  a spring within said cylinder;
  said spring being disposed within said first chamber;
  said first chamber being disposed at said first end of said cylinder;
  said spring comprising a first portion and a second portion;
  said first portion of said spring being disposed adjacent to said first end of said cylinder;
  said second portion of said spring being disposed away from said first end of said cylinder towards said piston;
  said cylinder having an inner wall;
  said first portion of said spring being disposed tightly against said inner wall of said cylinder; and
  said second portion of said spring being disposed about and substantially adjacent said first end portion of said piston rod;

wherein said second portion of said spring comprises a substantially non-compressible tightly wound portion comprising a plurality of coil turns, and wherein said plurality of coil turns of said second portion of said spring are in contact with one another upon said spring being in a relaxed, noncompressed state; and wherein the outer diameter of said piston rod is substantially equal to the inner diameter of said second portion of said spring.

* * * * *

UNITED STATES PATENT AND TRADEMARK OFFICE
CERTIFICATE OF CORRECTION

PATENT NO. : 5,595,270
DATED : January 21, 1997
INVENTOR(S) : Günther BRAUN and Sabine RUCKS It is certified that error appears in the above-indentified patent and that said Letters Patent is hereby corrected as shown below:

In column 8, line 36, after the first occurrence of 'the' insert --cross--.

Signed and Sealed this

Third Day of June, 1997

Attest:

BRUCE LEHMAN

Attesting Officer

Commissioner of Patents and Trademarks